(12) United States Patent
Qian et al.

(10) Patent No.: US 10,419,253 B2
(45) Date of Patent: Sep. 17, 2019

(54) BLIND CLASSIFICATION OF MODULATION SCHEME OF AN INTERFERING SIGNAL

(71) Applicants: ZTE Corporation, Shenzhen, Guangdong (CN); ZTE Canada Inc., Toronto (CA)

(72) Inventors: Xing Qian, Conestogo (CA); LiJuan Zhao, Guangdong (CN); JunLing Zhang, Guangdong (CN)

(73) Assignees: ZTE Corporation, Shenzhen (CN); ZTE Canada Inc., Toronto (CA)

( * ) Notice: Subject to any disclaimer, the term of this patent is extended or adjusted under 35 U.S.C. 154(b) by 0 days.

(21) Appl. No.: 15/849,584

(22) Filed: Dec. 20, 2017

(65) Prior Publication Data

US 2018/0176051 A1 Jun. 21, 2018

(30) Foreign Application Priority Data

Dec. 21, 2016 (WO) ................ PCT/CN2016/111343

(51) Int. Cl.
| | |
|---|---|
| H04L 27/00 | (2006.01) |
| H04L 25/03 | (2006.01) |
| H04B 1/7075 | (2011.01) |
| H04J 11/00 | (2006.01) |
| H04L 27/26 | (2006.01) |
| H04L 7/04 | (2006.01) |

(Continued)

(52) U.S. Cl.
CPC ..... *H04L 27/0012* (2013.01); *H04B 1/70758* (2013.01); *H04J 11/004* (2013.01); *H04J 11/005* (2013.01); *H04L 25/0307* (2013.01); *H04L 27/2647* (2013.01); *H04B 7/0413* (2013.01); *H04B 7/0417* (2013.01); *H04L 7/042* (2013.01); *H04L 27/2613* (2013.01)

(58) Field of Classification Search
CPC ............. H04L 27/0012; H04L 27/2647; H04L 25/0307; H04L 27/2613; H04L 7/042; H04J 11/005; H04J 11/004; H04B 1/70758; H04B 7/0417; H04B 7/0413
USPC .................................. 375/340, 348; 370/252
See application file for complete search history.

(56) References Cited

U.S. PATENT DOCUMENTS

| | | | | |
|---|---|---|---|---|
| 2011/0035522 | A1* | 2/2011 | Tan ..................... | G06F 13/28 710/107 |
| 2014/0160949 | A1* | 6/2014 | Clausen ............... | H04L 5/0073 370/252 |

(Continued)

*Primary Examiner* — Chieh M Fan
*Assistant Examiner* — Fitwi Y Hailegiorgis
(74) *Attorney, Agent, or Firm* — Perkins Coie LLP

(57) ABSTRACT

A technique for wireless signal processing performed at a receiver in a wireless network includes receiving, by a wireless receiver, an orthogonal frequency division multiplexing (OFDM) signal on a shared downlink channel from the wireless network, wherein the OFDM signal includes contribution from a serving cell signal and at least one interfering signal, obtaining an estimate of the serving cell signal, calculating a residual signal by subtracting the estimate of the serving cell signal from the OFDM signal, generating a whitened residual signal by whitening the residual signal, obtaining an estimate of a modulation scheme of the at least one interfering signal by performing a likelihood-based blind classification on the whitened residual signal, and performing further receiver-side processing of the serving cell signal using the estimate of the modulation scheme of the at least one interfering signal.

20 Claims, 7 Drawing Sheets

(51) Int. Cl.
H04B 7/0413 (2017.01)
H04B 7/0417 (2017.01)

(56) References Cited

U.S. PATENT DOCUMENTS

2014/0307569 A1* 10/2014 Barbieri ............... H04L 5/0032
370/252
2015/0229373 A1* 8/2015 Lee ........................ H04B 1/10
375/347

* cited by examiner

BLIND CLASSIFICATION OF MODULATION SCHEME OF AN INTERFERING SIGNAL

CROSS REFERENCE TO RELATED APPLICATIONS

This patent document claims the benefit of priority under 35 U.S.C. § 119(a) and the Paris Convention of International Patent Application No. PCT/CN2016/111343, filed on Dec. 21, 2016. The entire content of the before-mentioned patent application is incorporated by reference as part of the disclosure of this patent document.

TECHNICAL FIELD

The present document generally relates to signal processing in a digital communication receiver.

BACKGROUND

As the number of wireless user devices increases, so does the use of spectrum for wireless transmissions. Often, signals from multiple communication networks are receivable at locations, especially densely populated areas and public places. Many traditional data reception techniques are not adequately able to handle situations where interferences from other neighboring devices and networks may degrade the quality of a desired signal being received.

SUMMARY

This document discloses, among other things, a complexity-reduced method for blindly classifying the modulation scheme of an interfering signal.

Embodiments may be based on a Euclidean distance near maximum likelihood algorithm within multiple hypotheses on the possible modulation scheme to estimate the constellation of the interferer. Due to adding more antennas in Multiple-Input Multiple-Output (MIMO) technology to increase spectral efficiency, the complexity of modulation classification algorithms increases exponentially, especially when each layer is allowed to have higher modulation order independently. An empirical searching procedure for constellation points based on QR decomposition and fixed sphere-decoding can be used to explore all constellation points inside sphere centered at the received symbols for classification metrics calculation. The near-optimal likelihood-based modulation classification with low-complexity is especially efficient for MIMO systems with multiple-layer transmission.

With the disclosed searching procedure, complexity is reduced considerably without notable loss of performance. Considering that modulation classification is typically performed prior to other parameter detection and the results of modulation classification are used for detection of other parameters, the disclosed techniques may be used for joint blind detection with other parameters in practical application.

The disclosed technique can be used to reconstruct interfering signals at a receiver with interference cancellation (IC) capability for a practical interference limited system, e.g., for an advanced network-assisted interference cancellation and suppression (NAICS) receiver.

In one example aspect, a technique for wireless signal processing performed at a receiver in a wireless network is disclosed. The technique includes receiving, by a wireless receiver, an orthogonal frequency division multiplexing (OFDM) signal on a shared downlink channel from the wireless network, wherein the OFDM signal includes contribution from a serving cell signal and at least one interfering signal, obtaining an estimate of the serving cell signal, calculating a residual signal by subtracting the estimate of the serving cell signal from the OFDM signal, generating a whitened residual signal by whitening the residual signal, obtaining an estimate of a modulation scheme of the at least one interfering signal by performing a likelihood-based blind classification on the whitened residual signal, and performing further receiver-side processing of the serving cell signal using the estimate of the modulation scheme of the at least one interfering signal.

In another example aspect, a technique is disclosed for a wireless receiver apparatus that includes a receiver circuit that receives, on a shared downlink channel from a wireless network, an orthogonal frequency division multiplexing (OFDM) signal including contribution from a serving cell signal and at least one interfering signal, and includes a processor that processes the received OFDM signals by obtaining an estimate of the serving cell signal, calculating a residual signal by subtracting the estimate of the serving cell signal from the OFDM signal, generating a whitened residual signal by whitening the residual signal, obtaining an estimate of a modulation scheme of the at least one interfering signal by performing a likelihood-based blind classification on the whitened residual signal, and performing further receiver-side processing of the serving cell signal using the estimate of the modulation scheme of the at least one interfering signal.

In another example aspect, a technique for wireless signal processing performed at a receiver in a wireless network is disclosed. The technique includes receiving a signal that includes a desired signal, which carries information intended to be received, and an interfering signal, which is an undesired signal superimposed on the desired signal, obtaining a residual signal by subtracting the desired signal from the received signal, and determining a modulation scheme of the interfering signal using a likelihood calculation procedure based on certain constellation points of a first candidate modulation scheme having minimum distances from constellation points of the residual signal and based on corresponding constellation points of a second candidate modulation scheme closest to the first constellation points of the candidate modulation scheme. The programs further include instructions for whitening the residual signal before determining the modulation scheme of the interfering signal. The likelihood calculation procedure is performed by using an empirical search procedure over a plurality of modulation scheme hypotheses. Here, the modulation scheme of the interfering signal may be determined by using a search procedure that uses pre-calculated lookup tables indicative of a modulation scheme. The modulation scheme of the interfering signal may be determined by searching for constellation points that minimize an Euclidean distance between the constellation points of the residual signal and the first candidate modulation scheme, by selecting, for the second candidate modulation scheme, constellation points closest to the constellation points of the first candidate modulation scheme, by calculating a likelihood for each candidate modulation scheme, and by selecting the modulation scheme having the maximum likelihood. In addition, before calculating the likelihood, determining the modulation scheme of the interfering signal may also include selecting, for a third candidate modulation scheme, constellation points obtained using a fixed sphere decoding technique based on the constellation points of at least one of the first and second candidate modulation schemes.

In another example aspect, the technique may be embodied as a process implemented by a processor of wireless receiver apparatus.

In another example aspect, the technique may be embodied as processor-executable code. In yet another example aspect, the processor-executable code may be stored in a computer-readable memory.

These, and other features, are described in the present patent document.

DETAILED DESCRIPTION

Figure 1:
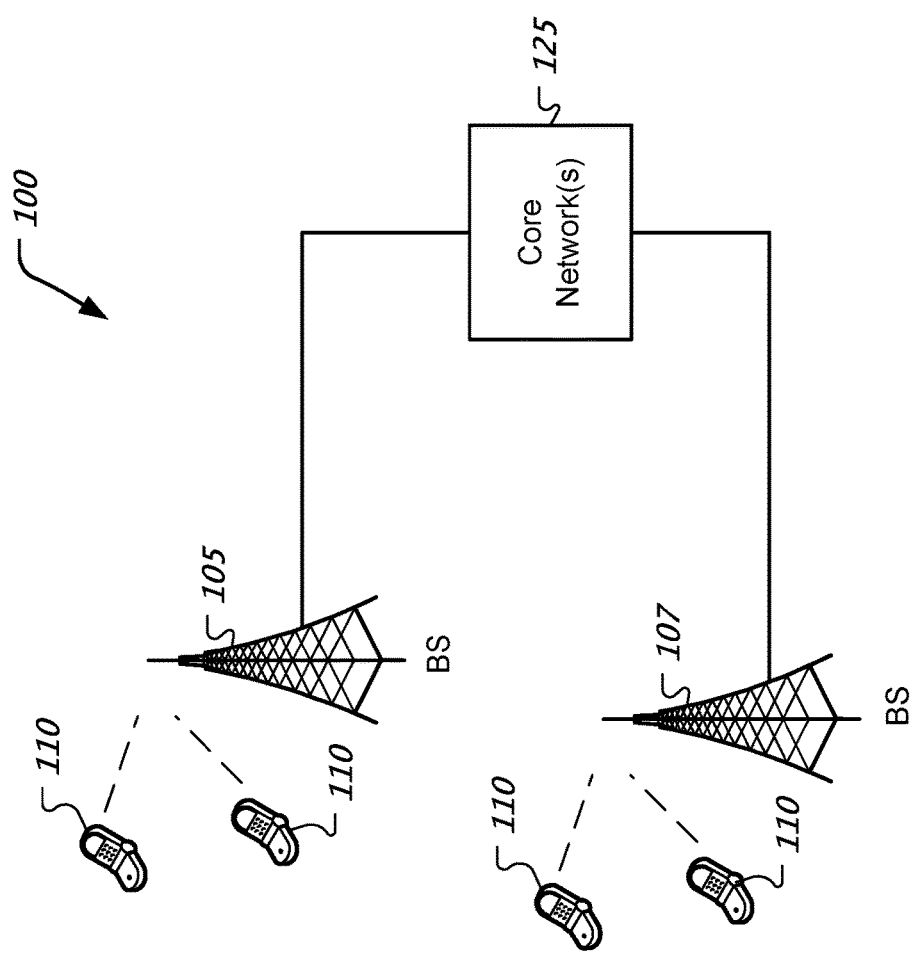
FIG. 1 shows an example of a wireless communication network.

Wireless data service requirement has been tremendously growing in recent years due to new generation of wireless gadgets, e.g., smartphone, tablet, and also due to fundamental evolution of application from being voice and data-centric to multimedia-centric. In order to cope with the exponential growth of data services, techniques that are more flexible and aggressive in spectrum management and improve cell spectral efficiency will be useful in future wireless deployments. It has been shown that spatial frequency reuse by adding more cells offers a larger capacity gain compared to the increased spatial order or increased spectral bandwidth. Industry standards such as Long-Term Evolution (LTE)-Advanced and beyond are expected to utilize frequency spectrum efficiency by using the small cell technology and are also designed for the so-called frequency reuse operation where all the cells use the same frequency. In practice, using the same frequency band in neighboring cells will cause high levels of inter-cell interference especially at cell edges. Consequently, high levels of interference, low signal-to-interference-plus-noise ratio (SINR) and poor receiver performance can be expected for areas near the cell-edge user equipment (UE). In this context, most of the recent wireless systems are interference limited rather than noise limited.

Understanding and mitigating interference is helpful to the performance improvement of wireless networks. In general, the interfering signals comprise intra-cell interference signals and/or inter-cell interfering signals. Intra-cell interference comes from Multi-User Multiple Input Multiple Output (MU-MIMO) transmission to other UEs in the same serving cell as the victim UE (e.g., interfered UE). Inter-stream interference, which is due to the non-orthogonality of spatial MIMO streams dedicated to the same UE, can be called single user MIMO interference, and inter-user interference, which can arise between UEs served in the same cell and sharing the same resource, can be called MU-MIMO interference. Interference happening between UEs located in different cells can be referred to as inter-cell interference. Cancelling or suppressing interference may greatly improve both the cell capacity and coverage for interference limited system. MU-MIMO related intra-interference could be avoided at an Evolved Node B (eNodeB) by using feedback channel state information. The inter-cell interference issues are usually addressed by means of frequency domain Inter-Cell Interference Coordination schemes (ICIC) in LTE/LTE-A. Some ICIC methods were already introduced with Release 8/9 of the LTE standard.

In contrast to the coordination at transmission side, the interference can also be suppressed or eliminated at the receiver side to provide significant performance gains. For example, the inter-stream interference of serving cell can be eliminated with a Successive IC (SIC) algorithm. The SIC algorithm for inter-stream interference mitigation has been widely used for practical systems. Receiver-based solutions for downlink interference-limited systems have been specified in Release 11. Interference Rejection Combining (IRC) effectively performs Linear Minimum Mean Square Error (LMMSE) filtering of the received signal to reduce the contribution of the interference in spatial domain. It is shown that IRC achieves the best performance-complexity trade-off. Under higher interference levels, however, a significant performance loss of the IRC compared to the Interference-Aware Receiver (IAR) was observed in some implementations. To achieve effective interference mitigation at the UE, an optimal simplified IAR based on the maximum likelihood (ML) criterion has been investigated recently. The basic idea is that an interference-free (or interference-minimized) performance could be achieved if the UE receiver is capable of decoding and subtracting the interfering data stream successively (e.g., inter-cell codeword cancellation). However, information about the interfering modulation, coding scheme, and resource allocation, etc., is required, which is unavailable to the UE. To overcome this disadvantage of the IAR, an interference information estimator prior to the IAR had to be implemented by such implementations.

Network assistance enables the use of more advanced receivers including an aggressive non-linear structure, which has achieved promising performance gains compared to Release 11. IRC under link-level simulation. NAICS, including Enhanced Linear-MMSE-IRC (E-LMMSE-IRC), Symbol-Level Interference Cancellation (SLIC), CodeWord Interference Cancellation (CWIC), and Reduced complexity Maximum Likelihood (R-ML) receivers, proposed by 3rd Generation Partnership Project standards (3GPP) in Release 12, has the potential advantages of providing additional information to the UE in order to support its interference cancellation (IC) abilities. Performance enhancements to intra-cell and inter-cell interference mitigation at receiver are demonstrated by exploring the degree of interference knowledge with possible assistance from the network. Although the inter-cell CWIC can achieve the highest throughput among all schemes, it is dropped from the discussion due to its high complexity, and its need for tighter parameters, such as coding schemes and the rule scrambling the bit stream of interference, which are very difficult to get at the UE-side. SLIC has the best performance-complexity trade-off with reasonable parameter requirement for interfering signal. In general, 3GPP uses SLIC algorithm as NAICS' baseline receiver for performance comparison.

In contrast to the philosophy of interference suppression where the interference is directly suppressed and treated as background noise, there are generally two separate procedures for dealing with IC for NAICS receiver: interference information extraction and interference reconstruction from received signals. With full knowledge of interference, link-level simulations have shown that an NAICS receiver with IC gives the significant performance improvements. However, different IC algorithm based on different assumptions on the interferer's signal knowledge, may need different network-assisted information. Clearly, it is beneficial to obtain an accurate estimate of the interfering signal including the knowledge of its transmission structure and channel information before subtraction. Reliable estimation can therefore play an important role in achieving promising performance.

In the NAICS study item by 3GPP, various parameter candidates helpful for IC were identified. For example, parameters that are higher-layer configured per transmission session (e.g., transmission mode, cell-ID, MBSFN subframes, CRS antenna ports, $P_a/P_b$); parameters that are dynamically signaled during transmission session (e.g., CFI, PMI, RI, MCS, resource allocation, DMRS); and other deployment related parameters (e.g., synchronization, CP, sub-frame/slot alignment). These parameters are typically not available at UE side. It is possible to let receivers blindly detect those parameters associated with the interfering signal without any aid of signaling, but the complexity could be impractically high. However, dynamic signaling with all those parameters is also not feasible since interference characteristic may change per physical resource block (PRB) and per transmission time interval (TTI). In addition, during NAICS operation, the serving base station still should send signals information to victim UE not only for inter-cell information, but also for intra-cell information due to MU-MIMO transmission. Receivers would have to blindly detect at least some of these parameters without or with minimal network assistance. Generally, those parameters for target receiver such as SLIC include the number of antenna ports, channel estimation, modulation schemes, TM, $P_a$, etc.

Blind estimation typically uses the correlation between the assumed data sent and received without knowing the information of the exact transmitted data. Blind estimation schemes typically implement specified algorithms and use a sufficient number of received samples to perform statistical analysis, and regression. For example, the objective of blind modulation detection is to determine the type of modulation scheme used within the received samples. The only empirical data provided by the received noisy samples is the distance to closest legitimate constellation point of all the used modulation schemes. Assuming all other parameters can be estimated reliably, the modulation scheme is detected with likelihood classification algorithm by calculating the differences of Euclidean distance between the received samples and all the legitimate constellation points of all possible modulation schemes.

In order to not limit the flexibility of scheduling at eNodB, the interferer parameters are assumed to vary on a per-PRB pair granularity in the frequency and per-TTI in the time domain. Due to rapidly varying information content of physical channel, the blind detection may suffer higher complexity than expected and lower reliability than desired. In addition, there are the worst-case limitations for the accuracy and reliability of blind detection due to the requirement of 3GPP that is NACIS should be able to enhance link and system level performance via advanced receiver processing, while ensuring robustness compared to Rel-11 receiver performance when gains are not available. The blind detection of the interfering parameters is certainly a sensitive process as any parameter misdetection leads to the incorrect identification of the interfering signal and might even bring a performance penalty in practical application, as cancelling the wrong information might have the effect of noise amplification. The systems and methods, therefore, need to increase the reliability of the blind detection, while lowering the complexity. It is not trivial pursuit for UE NACIS receiver design.

Modulation classification is the task of recognizing the modulation scheme employed at the transmitter of a detected signal, which is useful for various military and civilian applications. Modulation classification techniques can be classified into two categories: a feature-based classification that depends on the statistical properties, and the ML classification that is based on likelihood-based approaches. Feature-based methods are usually simple to implement but the performance varies significantly depending on applications and selected features. This document primarily focuses on the latter approach. The ML classifier minimizes the average probability of decision error for equally probable modulations, the difficulty lies on the complexity of log likelihood computation. Furthermore, although more antennas in MIMO technology result in an increase in spectral efficiency, the complexity increases exponentially, especially when each layer is allowed to have higher modulation order independently. The suboptimal scheme which minimizes the average log likelihood using only the distance from the closest constellation point to the received signal is chosen for demodulation. There is typically a bias towards the higher order modulation schemes irrespective of the actual modulation used due to the fact that there is more number of closer legitimate points for higher modulation schemes which would yield lower error rates. The modulation classification is also the pre-requisite step for other parameter detection, complexity-reduced modulation classification algorithm provides the possibility to develop advanced algorithm for joint blind detection with other parameters in practical application.

The present document discloses, among other techniques, a complexity-reduced method for blindly classifying the modulation scheme of interfering signal. The technique can be used for pre-processing interfering signal reconstruction at receiver with Interference Cancellation (IC) capability for a practical interference limited system. In order to cope with the exponential growth of data services in wireless system, we need more flexible and aggressive spectrum management to improve cell spectral efficiency.

The Network Assisted Interference Cancellation and Suppression (NACIS) has been proposed in 3GPP LTE-A Release 12 to combat the interference at least partially and considerably enhanced the performance of cell-edge user equipment (UE) in the interference limited system. However, the enhancement is under the assumption that the knowledge of interference transmission is known to the UE by network broadcast signaling or UE blind detection. The detailed parameters of knowledge include UE-specified traffic-to-pilot power ratio ($P_a/P_b$), Rank Indicator (RI), Precoding Matrix Indicator (PMI), modulation scheme, perhaps more parameters depending on the advanced receiver's type.

Algorithm, such as Symbol-Level Interference Cancellation (SLIC), Reduced complexity Maximum Likelihood (R-ML) and CodeWord Interference Cancellation (CWIC), could be used as target receiver's types, and were evaluated by 3GPP under NAICS environment thoroughly. Thereafter, CWIC was dropped from the discussion due to its high complexity, and because it requires tighter parameters. SLIC become the most feasible algorithm due to its achievable trade-off among the performance gain, complexity and required assistance parameters. SLIC is a successive IC-based receiver which operates by successively applying linear detection, reconstruction and cancellation of interfering signal at symbol level. The performance of SLIC receiver depends on how good the interfering signal is reconstructed. SLIC needs a bunch of reliable parameters of interfering signals, and few of them, at least Transmission Mode (TM) and modulation scheme had to be blindly detected because the network cannot signal all required parameters to UE due to limited network resource.

The blind detection is certainly a challenging pre-processing step because the received signals used for blind detection is super-positioned by both desired signal and interfering signal. Ideally, multiple parameters could be optimally detected jointly in one ML framework by minimizing the average probability of decision error with the assumption that the modes of allowed parameter combination have equal probability. But the optimality comes with high computational complexity due to the large number of modes and needs to be implemented on per-PRB and per Transmission Time Interval (TTI) granularity in application. It is evitable to reduce computational complexity for practical application. Some implementations using technology disclosed in the present document are focused on the complexity-reduced algorithm on classification of modulation scheme for interfering signals. It is based on Euclidean distance maximum likelihood algorithm within multiple hypotheses on the possible modulation scheme to estimate the constellation of the interferer.

This document discloses an empirical searching procedure for constellation points based on QR decomposition and fixed sphere-decoding to explore all constellation points inside sphere centered at the received symbols for classification metrics calculation. With the disclosed searching procedure, complexity is reduced considerably without loss the performance. Considering the modulation classification is basic algorithm for other parameter detection. The disclosed techniques provide the possibility to develop advanced algorithm for joint blind detection with other parameters in practical application.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to Its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code Division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
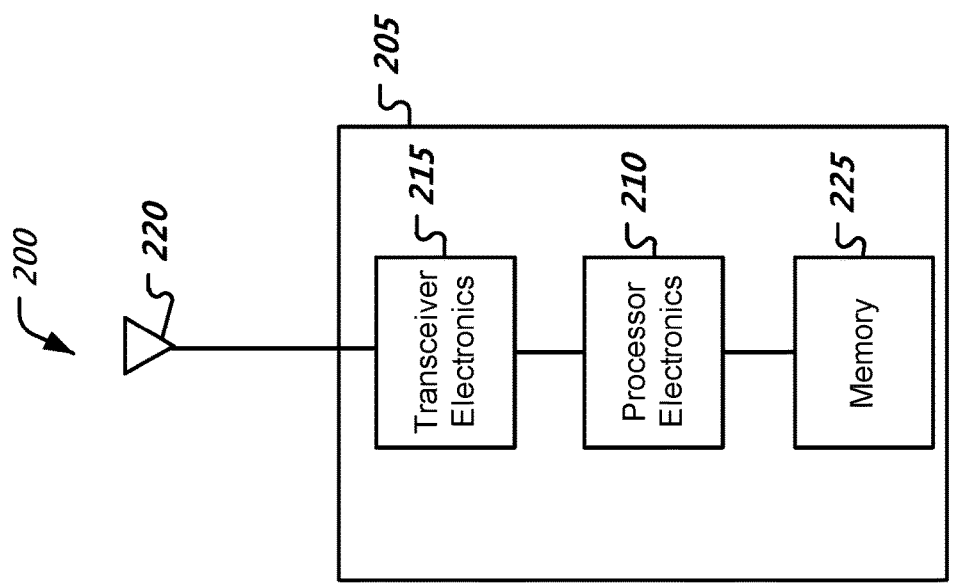
FIG. 2 is a block diagram of an example of a wireless communications apparatus.

FIG. 2 shows an example of a radio transceiver station 200 for implementing a wireless device, a base station or other wireless communication modules. Various examples of radio stations include base stations and wireless devices in FIG. 2. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interlaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on an orthogonal frequency-division multiplexing (OFDM) air interface. In some implementations, radio stations 205 can communicate using one or more wireless technologies such as Wi-Fi, WiMAX, LTE, and LTE-A. The disclosed techniques can be implemented on the radio station 205 and in the system depicted in FIG. 2.

Due to spectrum scarcity, most of LTE/LTE-A deployments currently reuse the same carrier frequency across neighboring cells. In addition, Multi-User MIMO can achieve high spectral efficiency by assigning the same time-frequency resource to more than one user. In this context, most of the recent wireless communication systems are interference limited rather than noise limited. In LTE-A Release-12 enhancements, an advanced receiver with IC capability is proposed to be used in LTE-A system at cell-edge to combat with strong multi-cell interferences and to improve system capacity compared with Release 11 IRC. The performance gain is achieved by increasing the degree of interfering transmission knowledge from blind parameter estimation with possible network-assistance. In order to realize the actual performance improvements in LTE-A systems, accuracy and reliable parameter estimation is of central important role in achieving IC effectively. For real-life deployed large-scale LTE network, channel condition, number of interfering sources generated from the surrounding time synchronized and/or unsynchronized cells change dynamically with time. Data transmission of interfering cell with dynamic ON/OFF statistical characteristic highly depends on the dynamic scheduling behavior in neighboring cells. So, IC of NAICS receiver would be sometimes feasible and sometimes not, depending on the achievable degree of interfering transmission knowledge from blind parameter estimation.

For example, Euclidean distance near maximum likelihood algorithm within multiple hypotheses on the possible modulation scheme to estimate the constellation of the interferer may be used. Some embodiments use an empirical searching procedure for constellation points based on QR decomposition and fixed sphere-decoding to explore all constellation points inside sphere centered at the received symbols for classification metrics calculation. The near-optimal low-complexity likelihood-based modulation classification is especially efficient for MIMO systems under multiple-layer transmission.

Because of adding more antennas in MIMO technology to increase spectral efficiency, the complexity of modulation classification algorithms increases exponentially, especially when each layer is allowed to have higher modulation order independently. With the disclosed searching procedure, complexity is reduced considerably without notable loss of performance. Considering the modulation classification is basic algorithm for other parameters.

For illustrative simplicity, the neighbor interference model and general description specified in 3GPP TR 36.388 may be used. Let the number of simultaneously transmitting cells be N, including the serving cell. The received signal is given by the superposition of all N cells, transmitted signals including the serving cell, $$y_k = \sum_{i=1}^{N} \sqrt{\beta_i} H_{ik} P_i x_{ik} + n_k \quad (1)$$

In the above representation, $\beta_i$ the traffic to pilot power ratio of the signal is transmitted from $i^{th}$ cell, $H_{ik}$ is the channel matrix of the $i^{th}$ cell on $k^{th}$ RE, $x_{ik}$ is the modulated symbol transmitted by the $i^{th}$ cell on the $k^{th}$ subcarrier and assumed to have a unit power in average. In addition, $k=0, 1, 2, \ldots, K-1$, $P_i$ is the spatial precoding matrix used by the $i^{th}$ cell. K is the total number of observed subcarrier. The number of cells is N with one serving cell and N−1 interferers, assuming that Cell 1 and 2 are the serving cell and dominant interfering cell respectively. In some embodiments, UE attempts to cancel the data transmission on Cell 2. Similarly, a signal processing algorithm implemented by the receiver attempts to extract transmission information structure of Cell 2 robustly.

Assuming that only the desired signal and one single dominant interferer is taken into account explicitly at the receiver, the received signal could be rewritten as:

$$y_k = \sqrt{\beta_1} H_{1k} P_1 x_{1k} + \sqrt{\beta_2} H_{2k} P_2 x_{2k} + \sum_{i=3}^{N} \sqrt{\beta_i} H_{ik} P_i x_{ik} + n_k \quad (2)$$

Without loss of generality, assuming that severing cell signals is stronger than the interfering cell signal, E-LMMSE-IRC is applied first to suppress interference signal and to estimate the desired serving cell signal. Here, $\widehat{H_{1k}}$, $\widehat{H_{2k}}$ represent channel estimation, $\widehat{\beta_1}$, $\widehat{\beta_2}$ represent traffic to pilot power ratio, and $\widehat{x_{1k}}$, $\widehat{x_{2k}}$ represent modulated symbol per sub-carrier for serving cell and dominant interfering cell, and $\widehat{P_1}$, $\widehat{P_2}$ represent spatial pre-coding matrix. The pre-processed received symbol could be used for dominant interferer information extraction after post-cancellation for desired signal, $$\tilde{y}_k = \sqrt{\beta_2} H_{2k} P_2 x_{2k} + z_k \quad (3)$$

$$z_k = \sqrt{\beta_1} H_{1k} P_1 x_{1k} - \sqrt{\widehat{\beta_1}} \widehat{H_{1k}} \widehat{P_1} \widehat{x_{1k}} + \sum_{i=3}^{N} \sqrt{\beta_i} H_{ik} P_i x_{ik} + n_k \quad (4)$$

For simplicity, only one layer transmission is assumed for both target UE and interfering UE. The reliable channel estimation for both desired and interfering signals is available from reference symbols by using one of several well-known channel estimation techniques. The residual desired signal and all the other signals are treated as colored Gaussian and then whitened along with the background noise for interfering signal information detection. The granularity of detection may be selected to be one PRB pair within each sub-frame.

In one step of the operation, the interfering signal is the desired signal to be blindly detected. Several conventional detection algorithms could be applied to determine the dominant interferer. A more elaborate method is to calculate the difference between the received and pre-processed signal and the closest constellation point multiplied by the channel estimate and the traffic to pilot power ratio of the signal. The jointly estimated mapped symbol, pre-coding matrix $\widehat{P_2}$ and the traffic to pilot power ratio of the signal $\widehat{\beta_2}$ are the constellation point $\widehat{x_{2k}}$ that minimizes:

$$\min_{\widehat{x_{2k}}, \widehat{P_2}, \widehat{\beta_2}} \|\tilde{y}_k - \sqrt{\widehat{\beta_2}} \widehat{H_{2k}} \widehat{P_2} \widehat{x_{2k}}\|^2 \quad (5)$$

by taking hard decision. However, it is well known that the detection based on the minimum distance from the closest constellation point to the approximate interference signal $\tilde{y}_k$ is not optimal.

Examples of Blind Detection and IC Implementation

For the sake of explanation, a brief summary for the blind detection and IC implementation is given as following:

For simplicity, it is assumed that SLIC is the target receiver type. But the blind detection only for TM4 and modulation scheme of MIMO system with one and two layers is discussed in the following for instructional purposes. Other parameter detection is omitted for brevity.

The original received signals are super-positioned by desired and interfering signals. During pre-processing, the desired signal is subtracted or suppressed from the received signal so that the remaining signal is of the interference plus noise with a small residual desired signal. Then, spectral whitening of the residual desired signal plus noise is performed under the assumption that it is colored Gaussian, followed by likelihood-based interference modulation classification.

Assuming all other parameters related with interfering signals are known reliably, modulation classification can be based on Euclidean distance near maximum likelihood algorithm within multiple hypotheses on the possible modulation scheme.

For two layers transmission mode, there are two Code-Words (CW). They might have different modulation schemes. In some embodiments, a blind modulation classification of the two layers could be implemented jointly to get optimal performance, although at the price of increasing complexity.

During one TTI, downlink physical layer parameters are the same on per PRB basis. Therefore, in some embodiments, blind detection is implemented on a per-PRB pair granularity in the frequency and per-TTI in the time domain. As an example, a total 36 received signals from 3 OFDM symbols on each PRB-pair are used for blind detection.

With blindly detected interference information, the basic implementation of NAICS receiver is to make a soft interference estimation of the symbols and then cancel the interference caused by these symbols to desired symbols.

The ML classifier maximizes the average probability of decision error for equally probable downlink scheduling event (combination of modulation scheme and TM) at each PRB per TTI. The objective function to determine modulation scheme, RI and PMI can be formulated jointly as:

$$L = \arg\max_{X \in C_n; P_2 \in \{RI, PMI\}} \sum_{n_b=1}^{N_b} \ln\left\{\sum_{X \in C_n} \exp\left(-\frac{1}{\sigma_{nb}^2} \|\tilde{y}_k - \sqrt{\widehat{\beta_2}} \widehat{H_{2k}} \widehat{P_2} \widehat{x_{2k}}\|^2\right)\right\} \quad (6)$$

In the above equation, $C_n$ represents a known modulation constellation, $N_b$ represents a number of resource elements, RI represents a rank for at least one of data. PMI represents the PMI set for the corresponding Rank, and $\sigma_{nb}^2$ is a noise variance on each resource element.

For simplicity of explanation, the present document discusses embodiments based on joint detection of TM4 and other modulation schemes. It is assumed that the traffic to pilot power ratio is reliably known from some other blind detection algorithm. For simplicity, the objective function with above assumption can be reformulated as:

$$L = \arg \max_{\substack{X \in C_n \\ P_2 \in \{RI=1, PMI=0,1,2,3; RI=2, PMI=1,2\}}} \sum_{i=1}^{36} \ln \left\{ \sum_{X \in C_n} \exp\left(-\frac{1}{\sigma_i^2} \|\tilde{y}_i - \widetilde{H_{2k}} \widetilde{P_2} \widetilde{X_{2k}}\|^2\right) \right\} \quad (7)$$

Here examples of the known modulation scheme $C_n$ include QPSK, 16 QAM and 64 QAM. For CRS-based TM4, allowed rank indicator/precoding matrix indicator (RI/PMI) sets are PMI=0, 1, 2 and 3 for RI=1, and PMI=1 and 2 for RI=2. Note that the above equation dropped "i" for the index of received signal and assumed that the received $$\tilde{y}_i = \begin{pmatrix} y_0 \\ y_1 \end{pmatrix}$$

is interfering signal and effective channel estimation $\widetilde{H_{2k}}$ $\widetilde{P_2}$ are $$\begin{pmatrix} h_0 \\ h_1 \end{pmatrix} \text{ and } \begin{pmatrix} h_{00} & h_{01} \\ h_{10} & h_{11} \end{pmatrix}$$

layer and two layer transmission, respectively.

For each received sample at one specified RI/PMI pair, the calculation of likelihood is expressed as following for one layer:

$$l_n = \ln \left\{ \sum_{x \in C_n} \exp\left(-\frac{1}{\sigma^2} \left\| \begin{pmatrix} y_0 \\ y_1 \end{pmatrix} - \begin{pmatrix} h_0 \\ h_1 \end{pmatrix} x \right\|^2 \right) \right\} \quad (8)$$

For MIMO transmission with two layers, there are two codeword. The modulation scheme of two codeword is typically independent; modulation classification for two codeword could be implemented jointly as following:

$$l_{nm} = \ln \left\{ \sum_{x_0 \in C_n} \sum_{x_1 \in C_m} \exp\left(-\frac{1}{\sigma^2} \left\| \begin{pmatrix} y_0 \\ y_1 \end{pmatrix} - \begin{pmatrix} h_{00} & h_{01} \\ h_{10} & h_{11} \end{pmatrix} \begin{pmatrix} x_0 \\ x_1 \end{pmatrix} \right\|^2 \right) \right\} \quad (9)$$

where $x_i$ corresponds to constellation symbols and summation is over all constellation points of modulation scheme. The calculation could be computationally expensive due to log sum exponential operation, especially for 64-QAM.

The optimal likelihood-based modulation classification decides the modulation scheme that has the maximum likelihood within multiple hypotheses of possible modulation schemes, and hypothesis testing is performed on those possible modulation schemes by estimating the Euclidean distance based likelihood of constellation of interfering signal. Although it could achieve the best performance at cost of high computational complexity with an increase in the number of transmit antennas and constellation set size. However, the complexity could be reduced by analogizing to similar advanced algorithm in the MIMO system of near maximum likelihood detection by considering only limited number of constellation points, e.g., the only enumerating exploration of the lattice points inside a hyper sphere centered at the received symbol.

To reduce the complexity of computing the summation of the exponential function of the distance from various constellation points to the received signal, an empirical searching procedure as outline below could be used:

The Euclidean distance for one layer transmission is represented by:

$$d = (|y_0 - h_0 x|^2 + |y_1 - h_1 x|^2) \quad (10)$$

The calculation steps for likelihood of different modulation schemes may include searching the best x for minimizing d in four constellation points for QPSK, and calculating the metrics for QPSK as $-d/\sigma^2$ and denoting the best constellation with minimum d as $\widetilde{x_{QPSK}}$.

The calculation steps may include searching the best constellation x for minimizing d within four constellation points of 16 QAM which are the nearest to $\widetilde{x_{QPSK}}$, and denoting the best constellation with minimum d as $\widetilde{x_{16QPSK}}$. The calculation steps may also include calculating the summation of the likelihood metrics with only four constellation points of 16 QAM which are the closest to $\widetilde{x_{QPSK}}$.

The calculation steps may include finding the number and index of constellation point of 64 QAM inside a sphere centered at $\widetilde{x_{16QPSK}}$ with radius around 0.35 from a pre-calculated table and only including those constellation points in the summation of likelihood calculation for 64 QAM. Table 1 lists examples of constellation index of 64 QAM included in sphere radius of 0.35 for each constellation of 16-QAM.

TABLE 1

| Constellation Point Index of 16 QAM | Number of Constellation Points | Index of Constellation Point in 64 QAM | | | | | | | | | | |
|---|---|---|---|---|---|---|---|---|---|---|---|---|
| 0 | 12 | 0 | 1 | 2 | 3 | 4 | 6 | 8 | 9 | 17 | 19 | 34 | 35 |
| 1 | 10 | 0 | 2 | 4 | 5 | 6 | 7 | 12 | 13 | 38 | 39 | | |
| 2 | 10 | 0 | 1 | 8 | 9 | 10 | 11 | 12 | 14 | 25 | 27 | | |
| 3 | 8 | 4 | 5 | 8 | 10 | 12 | 13 | 14 | 15 | | | | |
| 4 | 12 | 1 | 3 | 16 | 17 | 18 | 19 | 20 | 22 | 24 | 25 | 50 | 51 |
| 5 | 10 | 16 | 18 | 20 | 21 | 22 | 23 | 28 | 29 | 54 | 55 | | |
| 6 | 10 | 9 | 11 | 16 | 17 | 24 | 25 | 26 | 27 | 28 | 30 | | |
| 7 | 8 | 20 | 21 | 24 | 26 | 28 | 29 | 30 | 31 | | | | |
| 8 | 12 | 2 | 3 | 32 | 33 | 34 | 35 | 36 | 38 | 40 | 41 | 49 | 51 |
| 9 | 10 | 6 | 7 | 32 | 34 | 36 | 37 | 38 | 39 | 44 | 45 | | |

TABLE 1-continued

| Constellation Point Index of 16 QAM | Number of Constellation Points | Index of Constellation Point in 64 QAM |     |     |     |     |     |     |     |     |     |
| --- | --- | --- | --- | --- | --- | --- | --- | --- | --- | --- | --- | --- |
| 10 | 10 | 32 | 33 | 40 | 41 | 42 | 43 | 44 | 46 | 57 | 59 |    |
| 11 | 8  | 36 | 37 | 40 | 42 | 44 | 45 | 46 | 47 |    |    |    |
| 12 | 12 | 18 | 19 | 33 | 35 | 48 | 49 | 50 | 51 | 52 | 54 | 56 | 57 |
| 13 | 10 | 22 | 23 | 48 | 50 | 52 | 53 | 54 | 55 | 60 | 61 |    |
| 14 | 10 | 41 | 43 | 48 | 49 | 56 | 57 | 58 | 59 | 60 | 62 |    |
| 15 | 8  | 52 | 53 | 56 | 58 | 60 | 61 | 62 | 63 |    |    |    |

The calculation steps for likelihood of different modulation for a two-layer transmission as following:

QR Decomposition

In order to reduce complexity, the channel matrix $$H = \begin{pmatrix} h_{00} & h_{01} \\ h_{10} & h_{11} \end{pmatrix}$$

is decomposed into orthogonal matrix Q and upper triangular matrix R which is given as H=QR, $$Q = \begin{pmatrix} q_{00} & q_{01} \\ q_{10} & q_{11} \end{pmatrix}$$

is an orthogonal matrix, i.e., $Q^H=Q^{-1}$ satisfying the condition $Q^H Q=I$, I is the identify matrix.

$$R = \begin{pmatrix} R_{00} & R_{01} \\ 0 & R_{11} \end{pmatrix}$$

is upper triangular matrix, then, $$H = \begin{pmatrix} h_{00} & h_{01} \\ h_{10} & h_{11} \end{pmatrix} = QR = \begin{pmatrix} q_{00} & q_{01} \\ q_{10} & q_{11} \end{pmatrix}\begin{pmatrix} R_{00} & R_{01} \\ 0 & R_{11} \end{pmatrix} \quad (11)$$

Q is derived as:

$$Q = \begin{pmatrix} q_{00} & q_{01} \\ q_{10} & q_{11} \end{pmatrix} = \frac{1}{\sqrt{r}}\begin{pmatrix} h_{00} & h_{10}^* \\ h_{10} & -h_{00}^* \end{pmatrix} \quad (12)$$

$$\begin{pmatrix} R_{00} & R_{01} \\ 0 & R_{11} \end{pmatrix} = Q^H H = \frac{1}{\sqrt{r}}\begin{pmatrix} r & h_{01}h_{00}^* + h_{10}h_{11}^* \\ 0 & h_{10}h_{01} - h_{00}h_{11} \end{pmatrix} = \frac{1}{\sqrt{r}}\begin{pmatrix} L_{00} & L_{01} \\ 0 & L_{11} \end{pmatrix} \quad (13)$$

where $r=|h_{00}|^2+|h_{10}|^2$.

Next, Y is rotated by $Q^H$ $$Q^H Y = \begin{pmatrix} q_{00} & q_{01} \\ q_{10} & q_{11} \end{pmatrix}^H \begin{pmatrix} y_0 \\ y_1 \end{pmatrix} = \qquad (14)$$

$$\frac{1}{\sqrt{r}}\begin{pmatrix} h_{00}^* & h_{10}^* \\ h_{10} & -h_{00} \end{pmatrix}\begin{pmatrix} y_0 \\ y_1 \end{pmatrix} = \frac{1}{\sqrt{r}}\begin{pmatrix} h_{00}^* y_0 + h_{10}^* y_1 \\ h_{10} y_0 - h_{00} y_1 \end{pmatrix} = \frac{1}{\sqrt{r}}\begin{pmatrix} yq_0 \\ yq_1 \end{pmatrix}$$

By using the following relationship, $$Q^H Y = Q^H Q R X + Q^H n = R X + Q^H n \quad (15)$$

The following equation can be derived.

$$\frac{1}{\sqrt{r}}\begin{pmatrix} yq_0 \\ yq_1 \end{pmatrix} = \frac{1}{\sqrt{r}}\begin{pmatrix} L_{00} & L_{01} \\ 0 & L_{11} \end{pmatrix}\begin{pmatrix} x_0 \\ x_1 \end{pmatrix} + \begin{pmatrix} q_{00} & q_{01} \\ q_{10} & q_{11} \end{pmatrix}^H \begin{pmatrix} n_0 \\ n_1 \end{pmatrix} \quad (16)$$

So the distance metrics can be expressed equivalently as:

$$\left\|\begin{pmatrix} y_0 \\ y_1 \end{pmatrix} - \begin{pmatrix} h_{00} & h_{01} \\ h_{10} & h_{11} \end{pmatrix}\begin{pmatrix} x_0 \\ x_1 \end{pmatrix}\right\|^2 = \quad (17)$$

$$\left\|\frac{1}{\sqrt{r}}\begin{pmatrix} yq_0 \\ yq_1 \end{pmatrix} - \frac{1}{\sqrt{r}}\begin{pmatrix} L_{00} & L_{01} \\ 0 & L_{11} \end{pmatrix}\begin{pmatrix} x_0 \\ x_1 \end{pmatrix}\right\|^2 =$$

$$\frac{|yq_1 - L_{11}x_1|^2}{r} + \frac{|yq_0 - L_{00}x_0 - L_{01}x_1|^2}{r}$$

Defining two variables relating to two rotated received signals as:

$$d_1(x_1) = \frac{|yq_1 - L_{11}x_1|^2}{r},\ d_0(x_0, x_1) = \frac{|yq_0 - L_{00}x_0 - L_{01}x_1|^2}{r} \quad (18)$$

After QR decomposition for MIMO system for the two-layer transmission, the invariant likelihood calculation is represented as:

$$l_{nm} = \ln\left\{\sum_{x_0 \in C_n}\sum_{x_1 \in C_m} \exp\left(-\frac{1}{\sigma^2}(d_0(x_0, x_1) + d_1(x_1))\right)\right\} \quad (19)$$

Example Search Procedure

In some embodiments, the following search procedure can be used for estimating the likelihood function.

In step 1, $x_0$ is estimated approximately by searching best $\widetilde{x_0}$ to minimize $$\frac{|yq_0 - L_{00}x_0|^2}{r}$$

in sixty-four constellation points for 64 QAM, and the estimation of $x_0$ is denoted as $\widetilde{x_0}$.

In step 2, the best $x_1$ to minimize $d_0+d_1$ in four constellation points for QPSK is searched with the assumption of fixed $x_0(\widetilde{x_0})$, and the estimation of $x_1$ is denoted as $\widetilde{x_{1(QPSK)}}$. Subsequently, the log likelihood for QPSK of CW-1 is calculated.

In step 3, the best $x_1$ to minimize $d_0+d_1$ in 4 constellation points for 16-QAM, which are the closest to $\widetilde{x_{1(QPSK)}}$ at fixed $x_0(\widetilde{x_0})$, is searched. The estimation of $x_1$ is denoted as $x_1(\widetilde{16QAM})$. Subsequently, a summation of the likelihood with only those four cancellation points of 16-QAM is calculated.

In step 4, the number and index of constellation point of 64 QAM inside a sphere centered at $x_1(\widetilde{16QAM})$ with radius around 0.35 are found from a pre-calculated table.

In step 5, the summation of the likelihood for 64 QAM is calculated by using only the constellation points of 64-QAM found in the previous step. The number of the closest 64 QAM constellation for each constellation of 16 QAM are $$\{12,10,10,8,12,10,10,8,12,10,10,8\}. \quad (20)$$

The constellation indices are pre-searched and saved in the table. The average constellation number inside a hyper sphere centered at the optimal constellation point of 16-QAM is around ten.

With likelihood calculation procedures for CW-1, it is relatively straightforward to derive the calculation for CW-0 by rewriting the received sample as:

$$l_{nm} = \ln\left\{\sum_{x_0 \in C_n}\sum_{x_1 \in C_m} \exp\left(-\frac{1}{\sigma^2}\left\|\begin{pmatrix}y_0\\y_1\end{pmatrix} - \begin{pmatrix}h_{01} & h_{00}\\h_{11} & h_{10}\end{pmatrix}\begin{pmatrix}x_1\\x_0\end{pmatrix}\right\|^2\right)\right\} \quad (21)$$

So the likelihood metrics of CW-0 are calculated by QR-decomposition on the column swiped matrix $$\begin{pmatrix}h_{01} & h_{00}\\h_{11} & h_{10}\end{pmatrix},$$

and the above procedures are repeated with exchanged index $$\begin{pmatrix}x_1\\x_0\end{pmatrix}$$

for modulation schemes of QPSK, 16-QAM and 64-QAM, respectively.

After the calculation of the log-likelihood of each received sample, the average based on thirty-six received samples of 3 OFDM-symbols on each PRB-pair is given by:

$$\overline{L_{mn}}(RI/PMI) = \Sigma_{k=0}^{35} l_{mn}^k \quad (22)$$

After the calculation over all possible RI/PMI for TM4, and modulation schemes, the results are a set of average likelihood metrics, {12 (4×3) metrics for RI=1; 18 (2×3×3) metrics for RI=2}. These may be used for the simultaneous detection of TM4 and modulation scheme by finding TM (RI/PMI) and modulation scheme pair with maximum likelihood average metrics.

$$\{RI/PMI, \text{Mod Schemes of } CW0/CW1\} = \max_{\substack{RI/PMI \in \{RI=1,PMI=0,1,2,3\\RI=2,PMI=1,2\}\\CW0,CW1 \in \{QPSK,16QAM,64QAM\}}} \overline{L}(RI/PMI, CW0/CW1)$$

Comparing with sequential detection between TM and modulation scheme, joint detection could avoid the error propagation to get optimal detection performance in terms of minimal difference of Euclidean distance between the reconstructed soft symbols and received samples in ML sense. For practical application, such optimality comes with the condition of having sufficient lower complexity algorithm of modulation classification. The sphere size for MIMO systems in the above-disclosed technique may be an empirical parameter that impacts the performance of the technique. The larger radius includes more constellations in summation, the better the approximation of near-optimal of likelihood-based modulation classification, but with exponentially increasing the complexity. Based on system level simulation with sphere size 0.35, the complexity is reduced 97%, and performance loss is less than 0.2 dB. In various embodiments, a sphere size of between 0.3 and 0.4 may be used.

Figure 3:
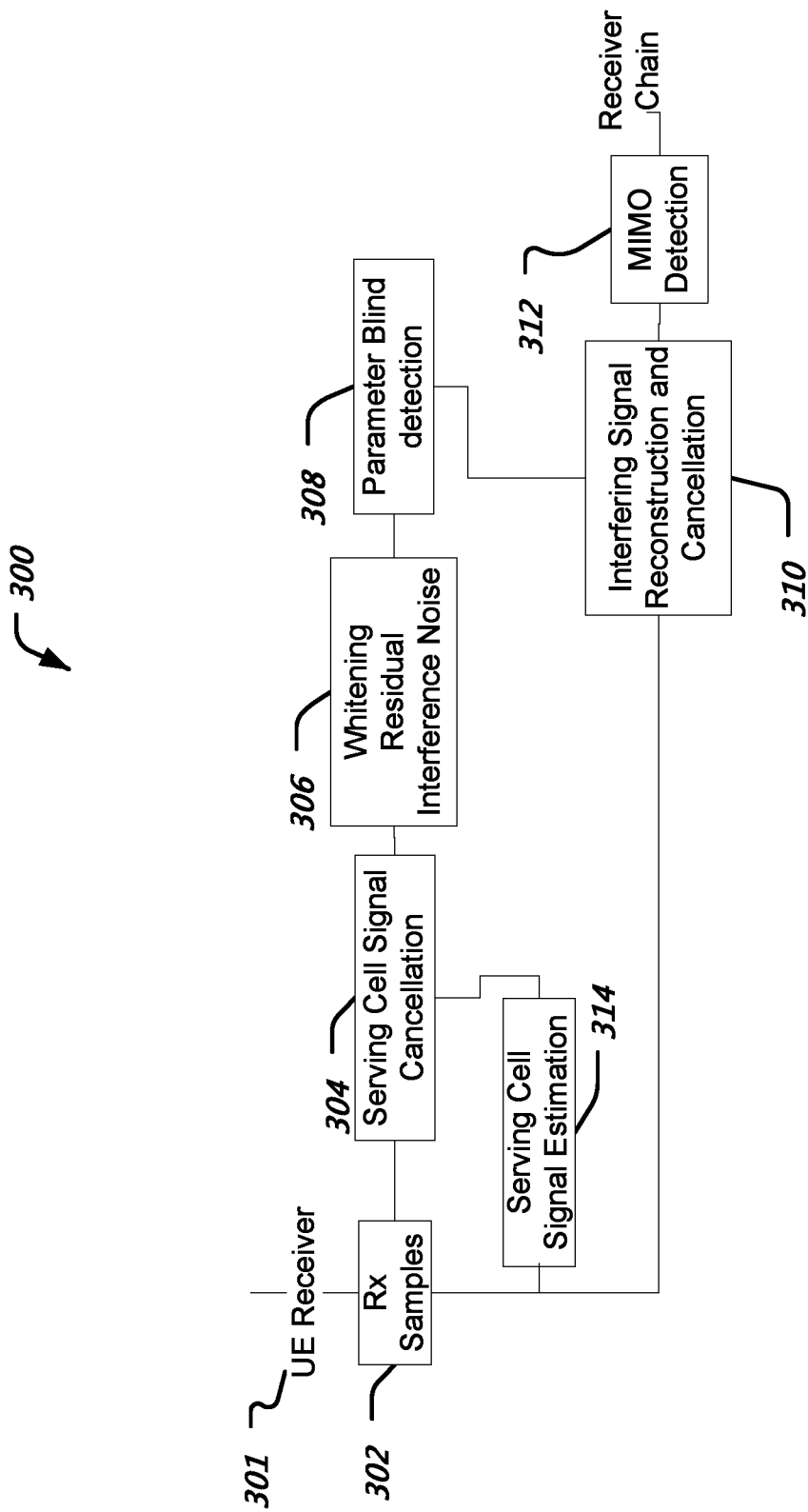
FIG. 3 is a block diagram of an example of a receiver for wireless communication.

FIG. 3 shows an example block diagram of a portion of a wireless signal receiver apparatus 300, in which some of the blind detection for interference information and SINR estimation techniques disclosed in this document can be used for processing received wireless signals. The receiver apparatus 300 may be embodied in the wireless receivers 110 or the receiver 200 as described herein. In the apparatus 300, signals are received by a UE receiver 301 and are converted to a stream of samples 302. The received samples may correspond to each RE, and may include contribution from signals of the serving cell and all interfering cell signals. The serving cell signal is estimated by a module 314 using a signal estimation algorithm, e.g., with E-LMMSE-IRC, using the availability of channel estimation for serving and interfering cells. The module 304 then cancels the serving-cell signal from the received samples, outputting residual samples whose main contribution may be from a dominant interfering cell signal. A whitening module 306 may perform the function of whitening the residual interference and noise signal. At block 308, the interfering information per subcarrier is blindly detected from residual samples. The resulting output is post-processed and then used in interfering signal reconstruction and cancellation 310 and MIMO detection 312. Metrics indicating the reliability of the blind detection generated at block 308 are provided to the interfering signal reconstruction and cancellation block 310, and then the resulting metrics are provided to the MIMO detection block.

Figure 4:
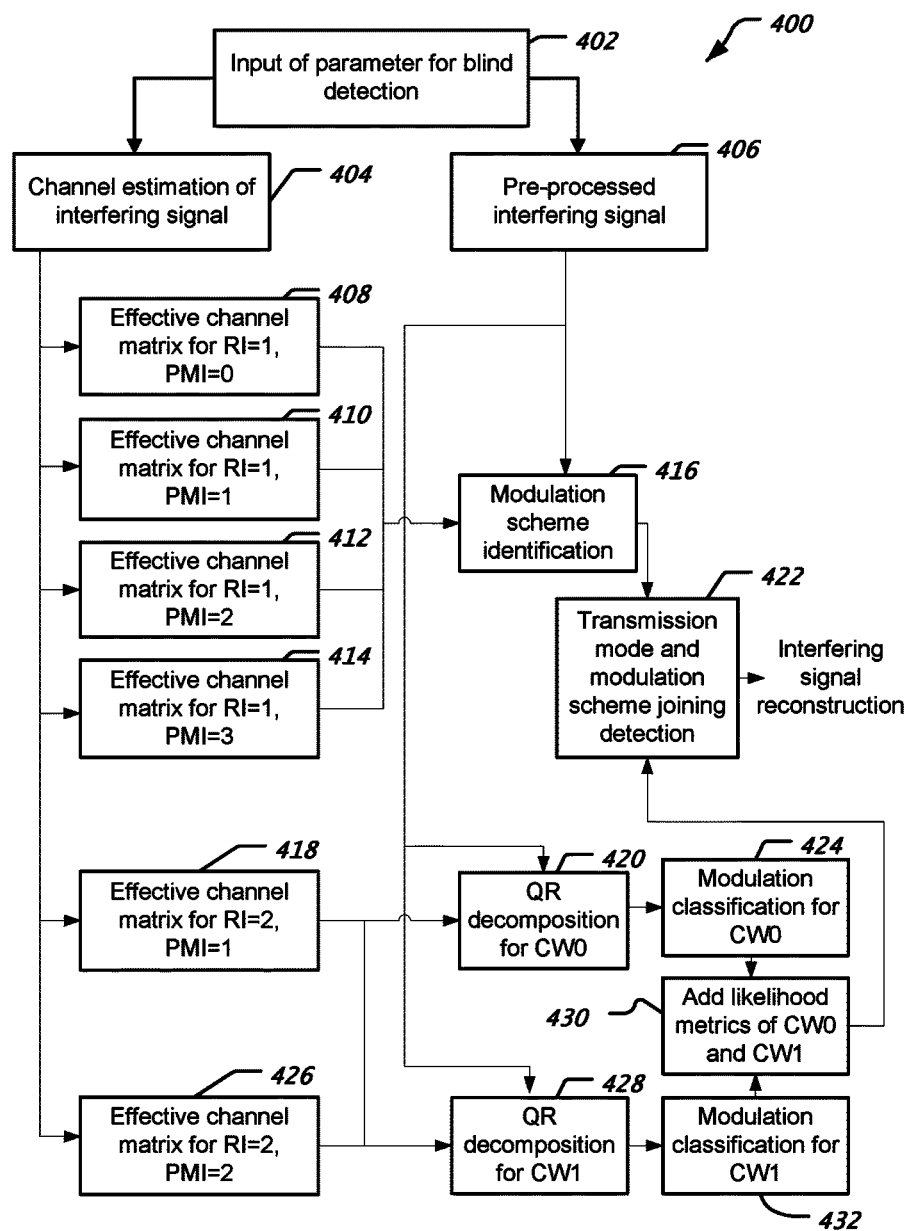
FIG. 4 is a flowchart for an example process of blind classification of modulation scheme of an interfering signal.

FIG. 4 illustrates a flowchart for a method 400 of processing received signals in a wireless communications receiver. At 402, parameters for blind detection are input to the method 400. Channel estimation of the interfering signal is performed at 404 and a pre-processed interfering signal is generated at 406. At 408, 410, 412 and 414, various effective channel matrices for different combinations of RI and PMI are tested out, with the outputs being used for modulation scheme identification at 416. Two specific cases when RI=2, for PMI=1 (418) and PMI=2 (426), QR decomposition may be performed for both codewords W0 (420) and CW1 (428) to obtain a corresponding modulation classification for CW0 (424) and CW1 (432). This may be followed by the generation of likelihood metrics for CW0 and CW1 (430). At 422, transmission mode and modulation scheme detection is performed, and the results are used for reconstructing an estimate of the interfering signal.

Figure 5:
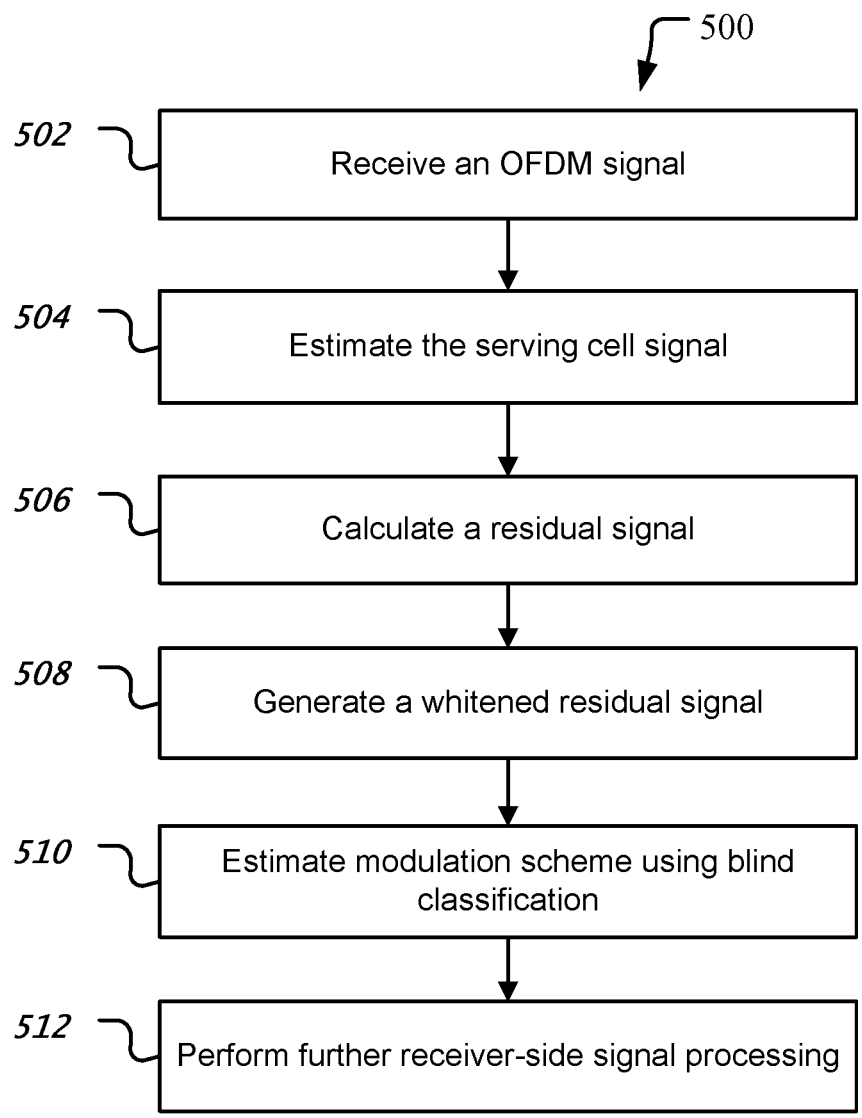
FIG. 5 is a flowchart of an example method of wireless communications.

FIG. 5 shows a flowchart for an example method 500 of wireless signal processing performed at a receiver in a wireless network.

The method 500 includes, at 502, receiving, by a wireless receiver, an orthogonal frequency division multiplexing (OFDM) signal on a shared downlink channel from the wireless network, wherein the OFDM signal includes contribution from a serving cell signal and at least one interfering signal.

The method 500 includes, at 504, obtaining an estimate of the serving cell signal. The estimation of the serving cell signal may be performed using any of well-known blind estimation techniques for estimating the presence or power of a pilot or reference signal.

The method 500 includes, at 506, calculating a residual signal by subtracting the estimate of the serving cell signal from the OFDM signal. In some embodiments, the residual calculation operation may be performed digitally, using special purpose hardware. Alternatively or additionally a processor may be programmed to perform the subtraction operation.

The method 500 includes, at 508, generating a whitened residual signal by whitening the residual signal.

The method 500 includes, at 510, obtaining an estimate of a modulation scheme of the at least one interfering signal by performing a likelihood-based blind classification on the whitened residual signal. In some embodiments, the likelihood-based blind classification may be performed using an empirical search procedure that tests a plurality of modulation hypothesis and selects one that is the best hypothesis. For example, as described with respect to Eq. 6 to Eq. 10, the empirical search procedure may include formulating an objective function and minimizing the value of the objective function. As previously discussed, in some embodiments, the search procedure may be implemented over multiple received signal symbols. For example, in some embodiments, three consecutive OFDM symbols may be used for the search procedure. Upon evaluation of the objective function for the various candidate symbol estimates, one with the least value of the function may be selected as the symbol transmitted by the interfering signal.

As described herein, in some embodiments, the empirical search procedure may include performing a QR decomposition of the channel matrix, e.g., in case of a MIMO receiver.

In some embodiments, the estimation of modulation scheme may use a search procedure that uses pre-calculated lookup tables. Example embodiments that use pre-calculated look-up tables are described with respect to Eq. (19) to Eq. (22). In some embodiments, symbol constellations may be estimated using a fixed sphere decoding technique. In various embodiments, the radius parameter that is used during fixed sphere decoding may be selected to be a number between 0.325 and 0.375. In some embodiments, the radius may be 0.35, as inventor's simulations showed this value of radius to be particularly suitable to results.

The method 500 includes, at 512, performing further receiver-side processing of the serving cell signal using the estimate of the modulation scheme of the at least one interfering signal. Further processing may include receiver-chain operations such as error correction decoding, and so on.

In some embodiments, a wireless communication receiver apparatus may include a memory, a processor, and one or more antenna to receive OFDM signals. The processor is programmable to read instructions from memory and implement a method as described with respect to the method 400 or 500.

Figure 6:
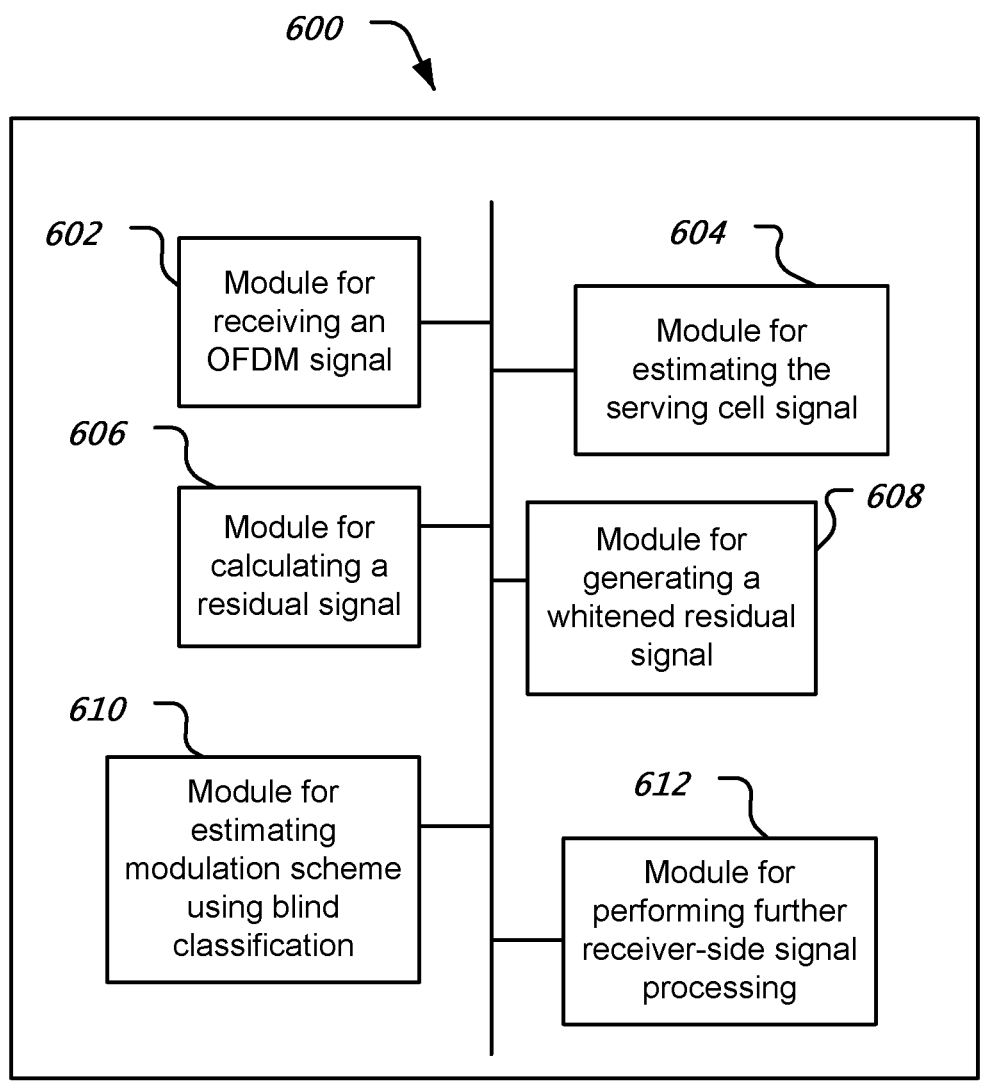
FIG. 6 is a block diagram of an example of a wireless communication apparatus.

FIG. 6 shows an example block diagram of a portion of a wireless signal receiver apparatus 600. The apparatus 600 includes a module 602 that receives an orthogonal frequency division multiplexing (OFDM) signal. The apparatus 600 includes a module 604 that estimates a serving cell signal.

For example, E-LMMSE-IRC may be used to estimate the desired serving cell signal. The apparatus 600 includes a module 606 that calculates a residual signal by subtracting the estimate of the serving cell signal from the OFDM signal. The apparatus 600 includes a module 608 that generates a whitened residual signal by whitening the residual signal. The apparatus 600 includes a module 610 that estimates a modulation scheme using a likelihood-based blind classification. In some embodiments, an empirical search procedure over a plurality of modulation scheme hypotheses may be used to estimate the modulation scheme. For example, the estimation of modulation scheme may be based on Euclidean distance maximum likelihood algorithm within multiple hypotheses on the possible modulation scheme to estimate the constellation of the interferer. The apparatus 600 includes a module 612 that performs further receiver-side signal processing.

Figure 7:
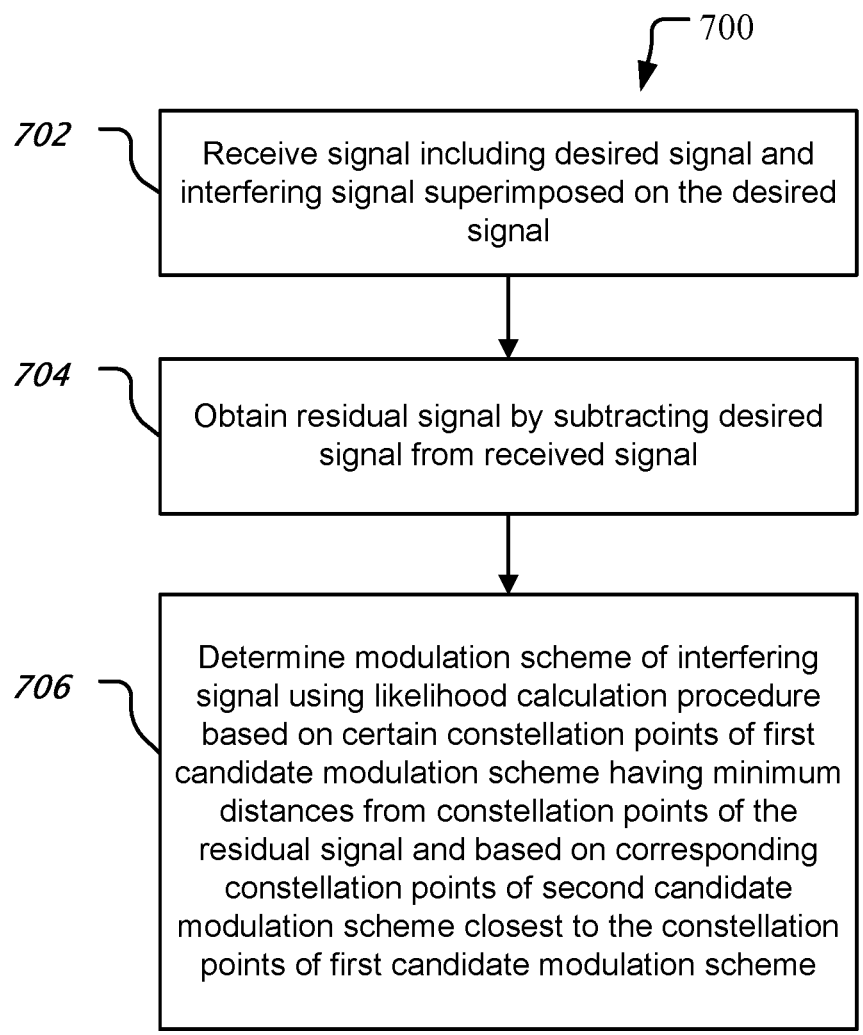
FIG. 7 shows a flowchart for an example method of wireless signal processing performed at a receiver in a wireless network.

FIG. 7 shows a flowchart for an example method 700 of wireless signal processing performed at a receiver in a wireless network. The method 700 includes, at 702, receiving a signal that includes a desired signal, which carries information intended to be received, and an interfering signal, which is an undesired signal superimposed on the desired signal. The method 700 includes, at 704, obtaining a residual signal by subtracting the desired signal from the received signal. The method 700 includes, at 706, determining a modulation scheme of the interfering signal using a likelihood calculation procedure based on certain constellation points of a first candidate modulation scheme having minimum distances from constellation points of the residual signal and based on corresponding constellation points of a second candidate modulation scheme closest to the constellation points of the first candidate modulation scheme. The programs further include instructions for whitening the residual signal before determining the modulation scheme of the interfering signal. The likelihood calculation procedure is performed by using an empirical search procedure over a plurality of modulation scheme hypotheses. Here, the modulation scheme of the interfering signal may be determined by using a search procedure that uses pre-calculated lookup tables indicative of a modulation scheme. The modulation scheme of the interfering signal may be determined by searching for constellation points that minimize an Euclidean distance between the constellation points of the residual signal and the first candidate modulation scheme, by selecting, for the second candidate modulation scheme, constellation points closest to the constellation points of the first candidate modulation scheme, by calculating a likelihood for each candidate modulation scheme, and by selecting the modulation scheme having the maximum likelihood. In addition, before calculating the likelihood, determining the modulation scheme of the interfering signal may also include selecting, for a third candidate modulation scheme, constellation points obtained using a fixed sphere decoding technique based on the constellation points of at least one of the first and second candidate modulation schemes.

It will be appreciated that a complexity-reduced method for blindly classifying the modulation scheme of interfering signal is disclosed for interfering signal reconstruction and interference cancellation. The ML method based on Euclidean distance is known to be optimal for modulation classification, but the optimality comes with high computational complexity especially for adding more antennas in MIMO system to increases spectral efficiency and allowing each layer to have higher modulation order independently. The complexity is due to the log likelihood computation of all constellation points for all allowed modulation schemes during the enumeration calculation of decision metrics. However, the complexity could be reduced by analogizing to similar advanced algorithm in the MIMO system of near ML detection by considering only limited constellation points.

With the disclosed searching procedure, it is proved that complexity is reduced considerably especially for multiple-codeword's joining classification in multiple-layer MIMO systems with different modulation schemes without notable loss of performance. Considering the modulation classification is basic algorithm for other parameter detection, such as transmission mode, the traffic to pilot power ratio of the signal. The disclosed techniques provide the possibility to develop advanced algorithm for joint multiple parameters blind detection to avoid error propagation existing in sequential detection in practical application.

The disclosed and other embodiments, modules and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Although several embodiments have been described in connection with specific NAICS application for instructional purposes, it is not limited thereto. For example, method is applicable for the modulation classification of multi-user successive IC in multi-user MIMO system and the non-orthogonal multiple access for future radio access. According, various modifications, adaptations, and combinations of various features of the description can be practiced without departing from the scope of the invention.

What is claimed is:

1. A method of wireless signal processing performed at a receiver in a wireless network, comprising:
   receiving, by a wireless receiver, an orthogonal frequency division multiplexing (OFDM) signal on a shared downlink channel from the wireless network, wherein the OFDM signal includes contribution from a serving cell signal and at least one interfering signal;
   obtaining an estimate of the serving cell signal;

calculating a residual signal by subtracting the estimate of the serving cell signal from the OFDM signal;
generating a whitened residual signal by whitening the residual signal;
obtaining an estimate of a modulation scheme of the at least one interfering signal by performing a likelihood-based blind classification on the whitened residual signal; and
performing further receiver-side processing of the serving cell signal using the estimate of the modulation scheme of the at least one interfering signal,
wherein the likelihood-based blind classification is performed by performing an empirical search procedure over a plurality of modulation scheme hypotheses, the empirical search procedure including formulating an objective function and minimizing a value of the objective function by performing QR decomposition of a channel matrix.

2. The method of claim 1, wherein the formulating the objective function includes:
formulating the objective function over a number of received OFDM symbols.

3. The method of claim 1, wherein the minimizing the value of the objective function includes:
evaluating, for a number of candidate symbol estimates, corresponding values of the objective function; and
selecting a candidate symbol estimate that results in a least value of the objective function.

4. The method of claim 3, wherein the number of candidate symbol estimates are processed for constellation estimation using a fixed sphere decoding technique.

5. The method of claim 4, wherein a radius parameter for the fixed sphere decoding technique is between 0.3 and 0.4.

6. The method of claim 1, wherein the obtaining the estimate of the modulation scheme is performed using a search procedure that uses pre-calculated lookup tables indicative of a modulation scheme.

7. The method of claim 1, wherein the blind classification is implemented in a frequency domain on a per physical resource block (PRB) granularity of transmission.

8. The method of claim 1, wherein the blind classification is implemented in a time domain on a per transmission time interval granularity.

9. A wireless receiver apparatus, comprising:
a receiver circuit that receives an orthogonal frequency division multiplexing (OFDM) signal on a shared downlink channel from a wireless network, the OFDM signal including contribution from a serving cell signal and at least one interfering signal; and
a processor that processes the received OFDM signals by:
obtaining an estimate of the serving cell signal;
calculating a residual signal by subtracting the estimate of the serving cell signal from the OFDM signal;
generating a whitened residual signal by whitening the residual signal;
obtaining an estimate of a modulation scheme of the at least one interfering signal by performing a likelihood-based blind classification on the whitened residual signal; and
performing further receiver-side processing of the serving cell signal using the estimate of the modulation scheme of the at least one interfering signal,
wherein the likelihood-based blind classification is performed by performing an empirical search procedure over a plurality of modulation scheme hypotheses, the empirical search procedure including formulating an objective function and minimizing a value of the objective function by performing QR decomposition of a channel matrix.

10. The apparatus of claim 9, wherein the formulating the objective function includes formulating the objective function over a number of received OFDM symbols.

11. The apparatus of claim 9, wherein the minimizing the value of the objective function includes:
evaluating, for a number of candidate symbol estimates, corresponding values of the objective function; and
selecting a candidate symbol estimate that results in a least value of the objective function.

12. The apparatus of claim 11, wherein the number of candidate symbol estimates are processed for constellation estimation using a fixed sphere decoding technique.

13. The apparatus of claim 12, wherein a radius parameter for the fixed sphere decoding technique is between 0.3 and 0.4.

14. The apparatus of claim 9, wherein the obtaining the estimate of the modulation scheme is performed using a search procedure that uses pre-calculated lookup tables indicative of a modulation scheme.

15. The apparatus of claim 9, wherein the blind classification is implemented in a frequency domain on a per physical resource block (PRB) granularity of transmission.

16. The apparatus of claim 9, wherein the blind classification is implemented in a time domain on a per transmission time interval granularity.

17. A method of wireless signal processing performed at a receiver in a wireless network, comprising:
receiving, by a wireless receiver, a signal on a shared channel from the wireless network, wherein the signal includes contribution from a serving cell signal and at least one interfering signal;
obtaining an estimate of the serving cell signal;
calculating a residual signal by subtracting the estimate of the serving cell signal from the signal;
generating a whitened residual signal by whitening the residual signal;
obtaining an estimate of a modulation scheme of the at least one interfering signal by performing a likelihood-based blind classification on the whitened residual signal, wherein the estimate of the modulation scheme is obtained by estimating constellation of the at least one interfering signal using QR decomposition and fixed sphere decoding; and
performing further receiver-side processing of the serving cell signal using the estimate of the modulation scheme of the at least one interfering signal.

18. The method of claim 17, wherein the likelihood-based blind classification is performed by performing an empirical search procedure over a plurality of modulation scheme hypotheses, the empirical search procedure including formulating an objective function over a number of received symbols and minimizing a value of the objective function by performing QR decomposition of a channel matrix.

19. The method of claim 18, wherein the minimizing the value of the objective function includes:
evaluating, for a number of candidate symbol estimates, corresponding values of the objective function; and
selecting a candidate symbol estimate that results in a least value of the objective function.

20. The method of claim 17, wherein a radius parameter for the fixed sphere decoding is between 0.3 and 0.4.

* * * * *